United States Patent
Gucyski et al.

(10) Patent No.: US 9,143,030 B2
(45) Date of Patent: Sep. 22, 2015

(54) PASSIVE POWER FACTOR CORRECTION INCORPORATING AC/DC CONVERSION

(71) Applicant: Teledyne Technologies Incorporated, Thousand Oaks, CA (US)

(72) Inventors: Jeff Gucyski, Huntington Beach, CA (US); Victor Chen, Marina Del Ray, CA (US); George Panagotacos, Corona, CA (US)

(73) Assignee: TELEDYNE REYNOLDS, INC., Thousand Oaks, CA (US)

( * ) Notice: Subject to any disclaimer, the term of this patent is extended or adjusted under 35 U.S.C. 154(b) by 192 days.

(21) Appl. No.: 13/647,979

(22) Filed: Oct. 9, 2012

(65) Prior Publication Data
US 2014/0098584 A1 Apr. 10, 2014

(51) Int. Cl.
H02M 7/06 (2006.01)
H02M 1/42 (2007.01)

(52) U.S. Cl.
CPC .......... *H02M 1/4208* (2013.01); *H02M 1/4266* (2013.01); *H02M 7/06* (2013.01); *Y02B 70/123* (2013.01)

(58) Field of Classification Search
CPC ....... H02M 1/32; H02M 7/06; H02M 1/4225; Y02B 70/126
USPC ............ 363/65, 67, 68, 69, 70, 89, 125, 126, 363/84; 323/205, 207, 208
See application file for complete search history.

(56) References Cited

U.S. PATENT DOCUMENTS

| | | | | |
|---|---|---|---|---|
| 4,949,234 A | * | 8/1990 | Gulczynski | 363/48 |
| 5,115,185 A | * | 5/1992 | Fraidlin et al. | 363/45 |
| 5,532,917 A | | 7/1996 | Hung | |

(Continued)

FOREIGN PATENT DOCUMENTS

| | | |
|---|---|---|
| DE | 4237262 A1 | 5/1994 |
| EP | 0696837 A1 | 2/1996 |

(Continued)

OTHER PUBLICATIONS

International Search Report and Written Opinion of the International Searching Authority for International Application No. PCT/US2013/063632 mailed Jul. 4, 2014.

(Continued)

*Primary Examiner* — Adolf Berhane
*Assistant Examiner* — Alex Torres-Rivera
(74) *Attorney, Agent, or Firm* — K&L Gates LLP

(57) ABSTRACT

A passive power factor correction (PFC) circuit is disclosed. It converts an AC input voltage into at least one DC output voltage. A diode bridge and a diode pair rectify the AC input voltage and provide first and second rectified voltages, respectively. A resistor applies the second rectified voltage to a first capacitor that stores the first voltage. A diode applies the first voltage to an inductor. The inductor applies the first rectified voltage to an output capacitor that stores the DC output voltage. The passive PFC circuit is intended to expand commonly used full-wave bridge rectifier and following storage capacitor. It can replace an input circuit, including low pass filter, in many applications even if improved power factor is not required. The passive PFC specifically targets size of the inductor while avoiding any switching, and maintaining power factor that challenges active PFC circuits. Early prototypes reached power factor of 0.99 while driving a 100 W load.

22 Claims, 2 Drawing Sheets

(56) References Cited

U.S. PATENT DOCUMENTS

| | | | |
|---|---|---|---|
| 5,561,596 A * | 10/1996 | Hemena et al. | 363/50 |
| 6,011,958 A * | 1/2000 | Yokota et al. | 455/73 |
| 6,043,705 A * | 3/2000 | Jiang | 327/589 |
| 6,052,290 A * | 4/2000 | Moreau | 363/20 |
| 6,239,992 B1 | 5/2001 | Hamaoka et al. | |
| 7,440,294 B2 * | 10/2008 | Peng et al. | 363/21.01 |
| 7,505,291 B2 * | 3/2009 | Wang et al. | 363/89 |
| 7,919,950 B2 * | 4/2011 | Uno et al. | 323/207 |
| 2010/0080026 A1 * | 4/2010 | Zhang | 363/89 |
| 2010/0201285 A1 * | 8/2010 | Dellian et al. | 363/126 |
| 2010/0246226 A1 * | 9/2010 | Ku et al. | 363/126 |
| 2012/0056604 A1 * | 3/2012 | Song et al. | 323/207 |
| 2013/0128638 A1 | 5/2013 | Irish | |

FOREIGN PATENT DOCUMENTS

| | | |
|---|---|---|
| FR | 2743953 A1 | 7/1997 |
| JP | 6-209574 | 7/1994 |

OTHER PUBLICATIONS

Prasad et al., "A Novel Passive Waveshaping Method for Single-Phase Diode Rectifiers", IEEE Transactions on Industrial Electronics, vol. 37, No. 6, Dec. 1, 1990, pp. 521-530.

* cited by examiner

PASSIVE POWER FACTOR CORRECTION INCORPORATING AC/DC CONVERSION

BACKGROUND

The present disclosure is related generally to passive power factor correction (PFC) circuits. More particularly, the present disclosure is directed to passive PFC circuits that provide a high power factor while utilizing a small number of passive components having reduced size.

Power factor is defined as the ratio of the real power to apparent power. It can be also defined as cosine of the phase angle between the current and voltage waveforms if both are pure sine waves. This occurs when the load is linear. The real power produces real work. The apparent power is the power that would be delivered to a pure resistive load, regardless of the current waveform. It is thus the total power supplied by an AC source to produce the required amount of the real power. The AC source is most often the power company supplying electricity through power lines but could also be the output of an electronic inverter, motor drive or other localized AC source. Due to energy stored in the load and returned to the source and/or due to a nonlinear load that distorts the wave shape of the current drawn from the source, the apparent power is greater than the real power. The power factor is 1.0 if both the input current and voltage are sinusoidal and in phase. This occurs when the load is or behaves like a resistor. It allows the power distribution system to operate at its maximum efficiency.

PFC may be needed in any line-powered device that uses AC/DC power conversion. These applications can range in scale from battery chargers for portable devices to big-screen TVs. Most commonly, the AC line voltage is rectified in a single phase bridge rectifier and filtered with a large electrolytic capacitor. These nonlinear and storage elements, also aided and abetted by the impedance of the power line itself, result in many problems such as reduction in the available power, increased losses and generation of serious harmonic distortions in the line current. The problems are magnified when operating a large numbers of these nonlinear loads due to the cumulative effect. The result is a poor power quality, wherein neutral currents can be large and rich in third harmonic currents.

Unless some correction circuit is used, the input rectifier with a capacitive filter circuit will draw pulsating currents from the AC source, resulting in poor power quality and high harmonic contents that adversely affect other users. The RMS value of the narrow pulses of the input current is higher than the corresponding sinusoidal current required to produce the same power. This situation has drawn the attention of regulatory bodies around the world. Governments are tightening regulations, setting new specifications for low harmonic currents and restricting the amount of harmonic currents that can be generated. This necessitates the need for PFC and harmonic reduction circuits.

PFC is required in various power systems supplied from line in order to comply with requirements of international standards such as EN61 000-3-2, Energy Star and 80 Plus. Without compliance to the appropriate standards, a product will have difficulties gaining acceptance in the marketplace. PFC is also necessary for energy saving. PFC usually reduces harmonics in the line current, increases the efficiency of the power systems and reduces customer's utility bill. In one estimate, the cost increase is directly proportional to the inverse of the power factor.

The methods to improve the power factor can be classified as active and passive methods. Active PFC circuits utilize feedback circuitry along with switching converters to synthesize input current waveforms consistent with high power factor. The advantages of the active PFC circuits include high power factor of at least 0.99, correction of both distortion and displacement, universal line voltage, regulated output voltage, small and light components, ability to absorb some line transients and design supported by vast array of integrated controllers. The disadvantages include complexity, output voltage that has to be greater than the peak of the input voltage, high cost especially for low power applications, no inrush current limiting, added conversion stage that decreases efficiency and increases EMI/RFI performance. The last shortcoming necessitates employment of a low pass filter at the input. The input ripple current is at the switching frequency of the active PFC circuit and must be filtered at the input. Unfiltered ripple will be conducted down the power line as EMI.

The passive PFC circuits incorporate passive components, typically capacitors and inductors. However, active components, such as synchronous rectifiers, emulating passive components can be used as well. The advantages of the conventional passive PFC circuits include simplicity, cost effectiveness especially at low power, high efficiency, reliability and ruggedness, no source of EMI/RFI, assistance with EMI/RFI filtering and capability of reaching unity power factor for linear loads. The disadvantages of the conventional passive PFC circuits include large and heavy line frequency components, inability to completely correct nonlinear loads, unregulated output voltage and component values dependent on load characteristics. The widely used valley-fill circuit is somewhat different. It employs rectifiers for diverting the current flow and capacitors for delivering energy to the load at low line voltage. However, the valley-fill circuit performs poorly when complementing the bridge rectifier and its storage capacitor.

Many applications do not require a power factor of at least 0.99 that the active PFC circuits commonly offer. The power factor of the passive PFC circuits can be tweaked in order to reduce size and cost of the components and yet meet performance requirements. For example, certain aircraft landing lights operating below 80 VA require leading power factor of 0.728 or lagging power factor of 0.613. Since an aircraft presents a very difficult EMI/RFI environment, the employment of the passive PFC is most advantageous. Moreover, many applications employ an input filter but no PFC due to disadvantages mentioned hereinabove. These applications could benefit greatly by replacing the input circuit, including low pass filter, with a passive PFC circuit without significantly raising the size and cost.

The present invention is intended to provide the passive PFC that incorporates many advantages of the PFC of both types while overcoming some disadvantages of the conventional passive PFC. Similarly to the active PFC circuits, the present PFC circuits are intended to expand the full-wave bridge rectifier and the following storage capacitor. The passive PFC technique according to the present disclosure specifically targets size of the inductor while avoiding any switching, and maintaining power factor that challenges active PFC circuits. Early prototypes reached power factor of 0.99 while driving a 100 W load.

SUMMARY

Various embodiments of the present disclosure are directed generally to passive PFC circuits. In one embodiment, a PFC circuit for converting an alternating current input voltage into at least one direct current output voltage is provided. The PFC circuit comprises a first rectifying means for rectifying the alternating current input voltage and providing a rectified voltage; a first capacitive means for storing a first voltage; a resistive means for applying the rectified voltage to the first capacitive means; a second capacitive means for storing the direct current output voltage; an inductive means for applying the rectified voltage to the second capacitive means; and a second rectifying means for applying the first voltage to the inductive means.

The foregoing summary may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein with reference to the drawings and the following detailed description.

BRIEF DESCRIPTION OF THE DRAWINGS

The novel features of the embodiments described herein are set forth with particularity in the appended claims. The embodiments, however, both as to organization and methods of operation may be better understood by reference to the following description, taken in conjunction with the accompanying drawings as follows.

DETAILED DESCRIPTION OF THE INVENTION

Before explaining the various embodiments of the passive PFC circuits in detail, it should be noted that the various embodiments disclosed herein are not limited in their application or use to the details of construction and arrangement of parts illustrated in the accompanying drawings and description. Rather, the disclosed embodiments are may be positioned or incorporated in other embodiments, variations and modifications thereof, and may be practiced or carried out in various ways. Accordingly, embodiments of the passive PFC circuits disclosed herein are illustrative in nature and are not meant to limit the scope or application thereof. Furthermore, unless otherwise indicated, the terms and expressions employed herein have been chosen for the purpose of describing the embodiments for the convenience of the reader and are not to limit the scope thereof. In addition, it should be understood that any one or more of the disclosed embodiments, expressions of embodiments, and/or examples thereof, can be combined with any one or more of the other disclosed embodiments, expressions of embodiments, and/or examples thereof, without limitation.

Figure 1:
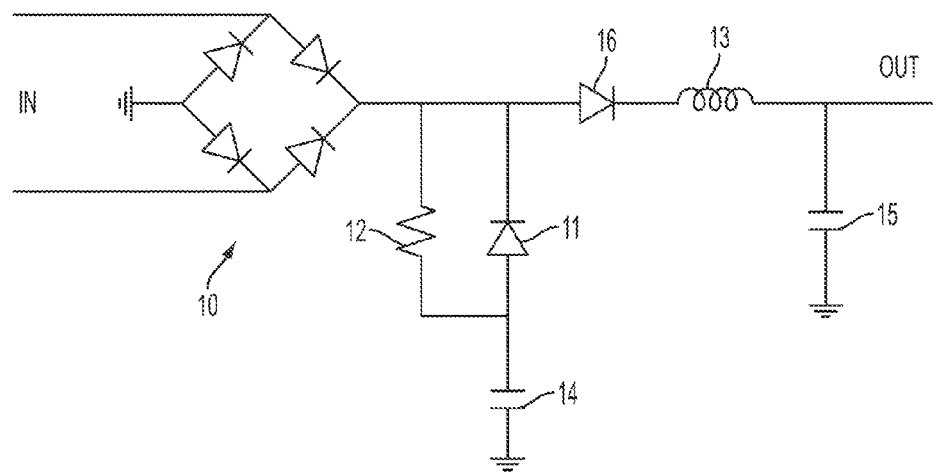
FIG. 1 is one embodiment of a passive PFC circuit comprising a single diode bridge.

FIG. 1 is one embodiment of a passive PFC circuit comprising a single diode bridge. The circuit converts an alternating current (AC) input voltage into a direct current (DC) output voltage. A first rectifying means rectifies the AC input voltage and provides a rectified voltage. A first capacitive means stores a first voltage. A resistive means applies the rectified voltage to the first capacitive means. A second capacitive means stores the DC output voltage. An inductive means applies the rectified voltage to the second capacitive means. A second rectifying means applies the first voltage to the inductive means. An optional diode prevents reverse energy flow from the second capacitive means to the first capacitive means.

Specifically, the AC input voltage is applied across a diode bridge 10. The rectified voltage thereof is applied to the cathode of a diode 11, the anode of an optional diode 16 and a resistor 12. The cathode of the diode 16 is connected to an inductor 13 and thus in series therewith. The diode 16 and the inductor 13 can be connected in the reverse order, wherein the cathode of the diode 11 can be connected to a tap of the inductor 13. The inductor 13 is further connected to an output capacitor 15 that stores the output voltage of the passive PFC circuit. A capacitor 14 is connected to the anode of the diode 11 and the resistor 12. The resistor 12 is thus in parallel with the diode 11. The diode bridge 10 and the capacitors 14 and 15 are grounded.

The bridge 10 comprises two pairs of diodes. The cathodes of one pair are tied together and provide the rectified voltage. The anodes of the other pair are grounded. The AC input voltage is applied between anodes and cathodes of the pairs respectively, i.e., across each diode pair. The bridge 10 fully rectifies the input voltage. The capacitor 14 is charged through the resistor 12 and discharged through the parallel coupled diode 11. Therefore, charging and discharging the capacitor 14 increases and decreases the input current of the PFC circuit respectively. Moreover, the input current drops to zero if the voltage stored in the capacitor 14 is larger than the rectified voltage, wherein the diode bridge 10 is cut off. Preferably, this condition occurs only near the zero crossing of the AC input voltage. Therefore, the capacitor voltage is substantially equal to zero near the zero crossing of the AC input voltage. The voltage of the capacitor 14 can fall slightly below zero due to forward voltage drop of the bridge 10 unless the voltage drop across the diode 11 is the same or higher.

The capacitor 14 is charged through the resistor 12. Therefore, the voltage stored in the capacitor 14 is smaller then the peak of the rectified voltage. The value of the capacitor 14 is chosen so that the input current drops to zero when the rectified voltage approaches zero, i.e. near zero crossing of the AC input voltage. The value of the inductor 13 is also sufficiently large so that the inductor 13 completes discharging the capacitor 14 near the zero crossing. Reverse polarity of the inductor current can be prevented by adding the diode 16.

Preferably, the inductor 13 is charged only when the rectified voltage is larger than the DC output voltage. The input current of the PFC circuit is equal to a difference between the current of the capacitor 14 and the inductor current. The AC input voltage and the inductor current are out of phase. The input current drops to zero near the zero crossing of the AC input voltage, whereas decreasing inductor current continues to flow. The inductor 13 completes discharging the capacitor 14 as the voltage stored therein reaches zero. Subsequently, the capacitor 14 is charged through the resistor 12. If the inductor 13 is too small, the inductor current may drop to zero before the zero crossing. If the inductor 13 is too large, the inductor current may substantially exceed charging current of the capacitor 14. In either case smaller power factor is accomplished.

The resistor 12 is employed in order to smooth out the charging current of the capacitor 14. The capacitor 14 is discharged near the zero crossing of the AC input voltage. The resistor 12 carries the charging current so long as the rectified voltage is greater than the capacitor voltage, regardless of the inductor current. Therefore, the capacitor 14 is charged through the resistor 12 while the rectified voltage reaches its peak and subsequently drops to the level of the capacitor voltage. At this point the diode 11 starts to conduct and discharging of the capacitor 14 begins. The chosen value of the capacitor 14 allows the rate at which the capacitor voltage falls to match the rate of the AC input voltage before reaching the zero crossing. This is accomplished due to the resonant interaction between the inductor 13 and the capacitor 14. Moreover, the bridge 10 conducts a portion of the inductor current. The inductor current reaches its peak after the peak of the rectified voltage. By contrast, the capacitor charging current and the rectified voltage reach their peaks simultaneously.

The output capacitor 15 has a large value so that the output voltage has a small ripple. The output voltage may be considered constant. The capacitor 15 is charged entirely through the inductor 13. The inductor 13 carries the output current, wherein the output capacitor 15 acts as a buffer. Therefore, the RMS value of the inductor current is equal to the output current delivered to the load. Preferably, the inductor current is unidirectional and continuous so that the current is constantly delivered to the output capacitor 15 regardless of the AC input voltage.

The optional diode 16 is in series with the inductor 13 and thus rectifies the inductor current. Preferably, the inductor current is unidirectional. However, if the conditions of the operation cannot guarantee that, e.g. due to a difficult load or nonlinearities of the inductor 13, the diode 16 can be used. Moreover, if reduced power factor is acceptable, a smaller inductance of the inductor 13 can be chosen in order to reduce its size and cost. In any case, the inductor current can prematurely drop to zero. Subsequently, without the diode 16, the inductor current flows in the opposite direction after the voltage stored in the capacitor 14 falls below the output voltage of the passive PFC circuit. This reverse energy flow to the capacitor 14 from the output capacitor 15 reduces the efficiency of the passive PFC circuit. The power factor is diminished, wherein the input current only partially charges the capacitor 14.

Figure 2:
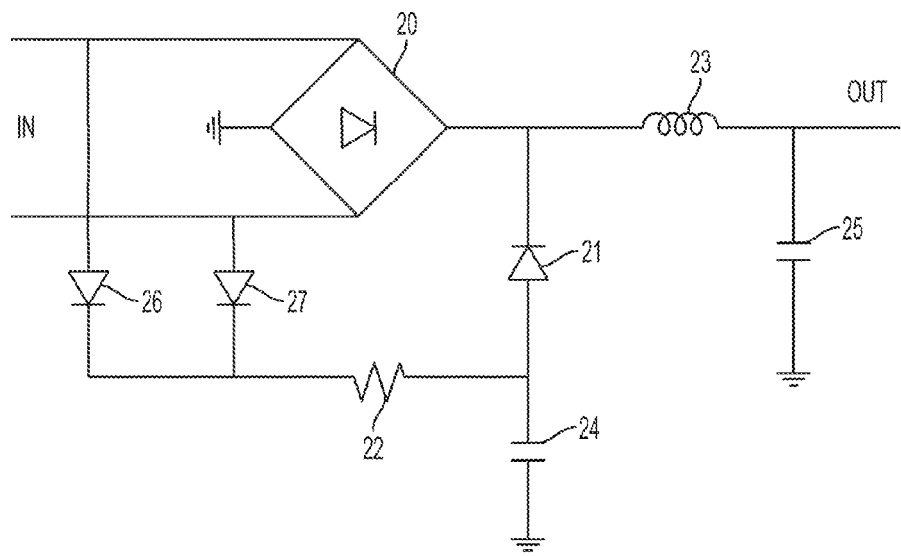
FIG. 2 is a preferred embodiment of a passive PFC circuit.

FIG. 2 is a preferred embodiment of a passive PFC circuit. The circuit converts an AC input voltage into a DC output voltage. A first rectifying means rectifies the AC input voltage and provides a first and second rectified voltages. A first capacitive means stores a first voltage. A resistive means applies the first rectified voltage to the first capacitive means. A second capacitive means stores the DC output voltage. An inductive means applies the second rectified voltage to the second capacitive means. A second rectifying means applies the first voltage to the inductive means.

Specifically, the AC input voltage is applied across a diode bridge 20 and between the anodes of a diode pair 26 and 27. The output voltage of the bridge 20 is applied to one end of an inductor 23 and the cathode of a diode 21. The other end of the inductor 23 is connected to an output capacitor 25 that stores the output voltage of the passive PFC circuit. The cathodes of the diodes 26, 27 and one end of a resistor 22 are tied together. A capacitor 24 is connected to the other end of the resistor 22 and the anode of the diode 21. The diode bridge 20 and the capacitors 24 and 25 are grounded.

The bridge 20 fully rectifies the input voltage, which results in double frequency of the rectified voltage. The diode pair 26 and 27 performs the same function. The pair represents one half of another bridge that shares the pair of grounded diodes with the bridge 20. Consequently, voltages appearing at outputs of the bridge 20 and the pair 26, 27 can be independently higher than the absolute value of the AC input voltage. Moreover, the inductor current is unidirectional.

In order to accomplish the sinusoidal input current, the capacitor 24 is fully discharged by the end of every cycle of the rectified input voltage. This is achieved by maintaining a sufficient current in the inductor 23. The capacitor 24 is thus charged through the diodes 26, 27 and discharged through the diode 21. The resistor 22 is employed in order to smooth out the charging current of the capacitor 24.

The inductor 23 carries the entire output current, wherein the output capacitor 25 acts as a buffer. The output capacitor 25 is large so that the output voltage has a small ripple. The output voltage may be considered constant. The inductor 23 is charged whenever the voltage appearing at the output of the bridge 20 is greater than the output voltage. Otherwise the inductor 23 is discharged. Preferably, the inductor current is continuous so that it is constantly delivered to the output capacitor 25, regardless of the AC input voltage.

Detailed equations describing various waveforms are quite complex. Moreover, many parasitic components affect the waveforms. For example, forward voltages of the bridge 20 and the diodes 26, 27 reduce the rectified voltages. Similarly, resistance of the inductor 23, caused by the resistance of the wire and losses in core material, reduces the output voltage. Moreover, unless the inductor 23 is coreless, its inductance decreases with increasing inductor current. The inductance drop accelerates dramatically when a saturation current is reached.

Component values can be estimated by employing simplified equations that govern conventional linear and resonant circuits. Measurements of prototypes have shown that the inductor current is nearly sinusoidal. The current of the inductor 23 is unidirectional. The DC component of the inductor current and the RMS value of the AC component are $i_{DC}$ and $i_{AC}$ respectively. The RMS value of the inductor current is equal to the output current $i_{out}$:

$$i_{out} = \sqrt{i_{DC}^2 i_{AC}^2} \qquad \text{Eq. 1}$$

The peak value of the inductor current is smallest if the PFC circuit operates in the critical conduction mode. The inductor current reaches zero point, which is the boundary condition between continuous and discontinuous conduction modes. In the critical conduction mode, the DC component of the inductor current is equal to the amplitude of the AC component. For sinusoidal current, the amplitude is equal to $i_{AC}$ multiplied by square root of 2. Therefore, the desired value of $i_{AC}$ is:

$$i_{AC} = \frac{i_{out}}{\sqrt{3}} \qquad \text{Eq. 2}$$

The peak value $i_{peak}$ of the inductor current is then:

$$i_{peak} = 2\sqrt{\frac{2}{3}} i_{out} \qquad \text{Eq. 3}$$

The voltage across the inductor 23 is the difference between RMS value Vin of the rectified input voltage and the output voltage $V_{out}$. According to Ohm's law, the voltage is also equal to the impedance of the inductor 23 multiplied by $i_{AC}$. The impedance is equal to the angular frequency w multiplied by the inductor value. The frequency is doubled since the AC input voltage is fully rectified. The preferred inductance L of the inductor 23, the approximate value of the output voltage in the critical conduction mode can be calculated.

$$V_{out} = V_{in} - \frac{2}{\sqrt{3}} \omega L i_{out} \quad \text{Eq. 4}$$

The inductor 23 and the capacitor 24 constitute a series resonant circuit when the diode 21 conducts. The resonant frequency is twice the frequency of the AC input voltage due to the full-wave rectification. The capacitance C of the capacitor 24 can be determined as follows:

$$C = \frac{1}{4\omega^2 L} \quad \text{Eq. 5}$$

The resistor 22 is employed to smooth out the input current after each zero crossing of the AC input voltage. Moreover, the resistor 22 allows the critically damped response of the resonant circuit. This circuit response results in the fastest possible decay without going into oscillation. Therefore, the desired state is reached as quickly as possible without overshooting. The critically damped response is accomplished when the resistance R of the resistor 22 is:

$$R = 2\sqrt{\frac{L}{C}} \quad \text{Eq. 6}$$

Figure 3:
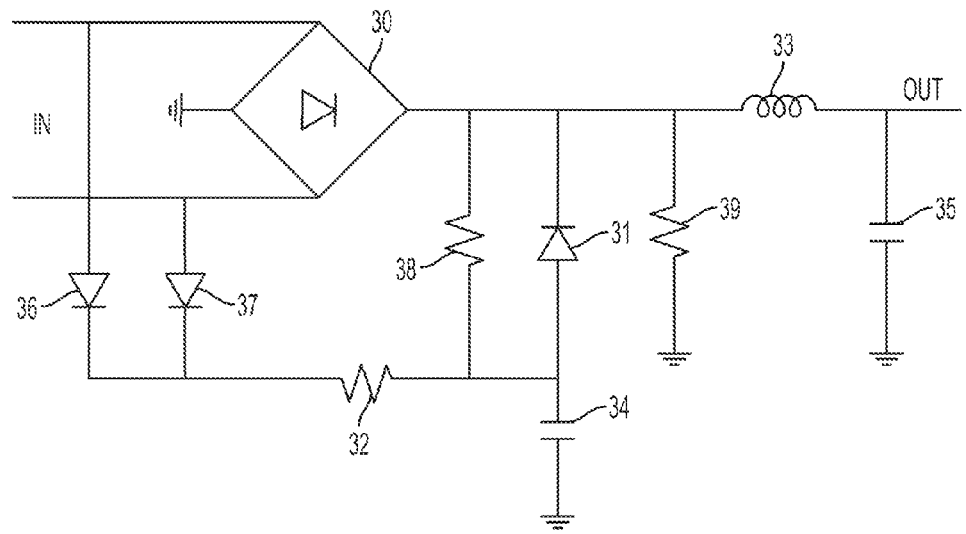
FIG. 3 is one embodiment of a passive PFC circuit illustrating a method of minimizing parasitic oscillations.

FIG. 3 is one embodiment of passive PFC circuit illustrating a method of minimizing parasitic oscillations. With reference also to the FIG. 2 embodiment, the passive PFC circuit in FIG. 3 comprises a pair of additional resistors, one of which is optional. Specifically, the AC input voltage is applied across a diode bridge 30 and between the anodes of a diode pair 36 and 37. The output voltage of the bridge 30 is applied to one end of an inductor 33, the cathode of a diode 31 and resistors 38 and 39. The other end of the inductor 33 is connected to an output capacitor 35 that stores the output voltage of the passive PFC circuit. The cathodes of the diodes 36, 37 and a resistor 32 are tied together. The capacitor 34 is connected to the resistors 32, 38 and the anode of the diode 31. The diode bridge 30, the resistor 39 and the capacitors 34 and 35 are grounded.

Parasitic oscillations occur at the output of the bridge 30 when the inductor current is low. Either the resistor 38 or 39 can be used to practically eliminate the oscillations. The resistor 39 is added between the output of the bridge 30 and ground. Alternatively, the resistor 38 can be used in parallel with the diode 31. Although either resistor has a relatively large value, the employment of the resistor 38 results in smaller power dissipation. The equations Eq. 5 and Eq. 6 can be used to calculate the resistance $R_S$ of the snubber resistor 38 or 39. $f_p$ is the frequency of the parasitic oscillations. $C_j$ represents a total junction capacitance of the bridge 30 and the diode 31.

$$R_s = \frac{1}{2\pi f_p C_j} \quad \text{Eq. 7}$$

Figure 4:
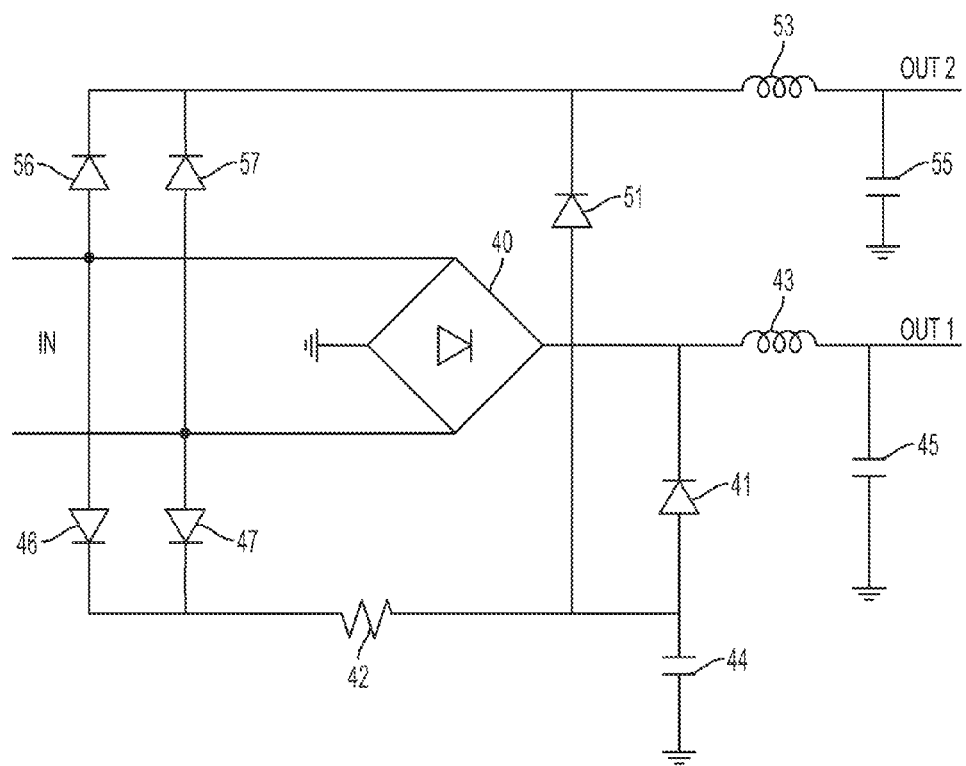
FIG. 4 is one embodiment of a passive PFC circuit comprising multiple outputs.

FIG. 4 is one embodiment of a passive PFC circuit comprising multiple outputs. With reference to the FIG. 1 embodiment, the first rectifying means provides a plurality of rectified voltages. The second capacitive means comprises a plurality of third capacitive means for separately storing one of the DC output voltages. The inductive means comprises a plurality of second inductive means for separately applying one of the rectified voltages to one of the third capacitive means. The second rectifying means comprises a plurality of third rectifying means for separately applying the first voltage to one of the second inductive means. With reference to the FIG. 2 embodiment, three diodes, one inductor and one capacitor are added.

The first rectifying means comprises a plurality of second rectifying means for providing the plurality of the rectified voltages, and a third rectifying means coupled to ground for providing a ground reference. Each second rectifying means is coupled to the third rectifying means and comprises a pair of rectifiers providing the respective rectified voltage. The third rectifying means comprises a pair of rectifiers coupled to ground. The diode bridge 40 has 4 diodes connected as shown in the corresponding bridge 10 in FIG. 1. Therefore, the second rectifying means comprises the diode pairs 46, 47 and 56, 57, and one half of the bridge 40 with the pair of diodes having cathodes connected to the diode 41 and the inductor 43. The third rectifying means is the other half of the bridge 40 with the pair of diodes having anodes connected to ground.

Specifically, the AC input voltage is applied across a diode bridge 40, between the anodes of a diode pair 46, 47 and between the anodes of a diode pair 56, 57. The output voltage of the bridge 40 is applied to one end of an inductor 43 and the cathode of a diode 41. The other end of the inductor 43 is connected to an output capacitor 45 that stores the first output voltage of the passive PFC circuit. Similarly, the cathodes of diodes 51, 56 and 57 are tied to one end of an inductor 53. The other end of the inductor 53 is connected to an output capacitor 55 that stores the second output voltage of the passive PFC circuit. The cathodes of the diodes 46, 47 and one end of the resistor 42 are tied together. A capacitor 44 is connected to the other end of the resistor 42 and the anodes of the diodes 41 and 51. The diode bridge 40 and the capacitors 44, 45 and 55 are grounded.

The bridge 40 fully rectifies the AC input voltage. The diode pairs 46, 47 and 56, 57 perform the same function. Each pair represents one half of another bridge that shares the pair of grounded diodes with the bridge 40. The additional components 51, 53, 55, 56 and 57 operate like the components 41, 43, 45, 46 and 47 respectively. The second output Out2 can be used for a smaller load that requires reduced voltage ripple while the main load is supplied from the first output Out1. Moreover, the output voltages at Out1 and Out2 can be substantially different.

It is worthy to note that any reference to "one aspect," "an aspect," "one embodiment," or "an embodiment" means that a particular feature, structure, or characteristic described in connection with the aspect is included in at least one aspect. Thus, appearances of the phrases "in one aspect," "in an aspect," "in one embodiment," or "an embodiment" in various places throughout the specification are not necessarily all referring to the same aspect. Furthermore, the particular features, structures or characteristics may be combined in any suitable manner in one or more aspects or embodiments.

Some or all of the embodiments described herein may generally comprise technologies which can be implemented, individually, and/or collectively, by a wide range of electrical components can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

The invention claimed is:

1. A power factor correction circuit for converting an alternating current (AC) input voltage into at least one direct current (DC) output voltage, the power factor correction circuit comprising:

a first rectifying means for rectifying the AC input voltage and providing a first rectified voltage, wherein the first rectifying means comprises a first full bridge rectifier;

a first capacitive means for storing a first voltage;

a second capacitive means for storing the at least one DC output voltage;

an inductive means for applying the rectified voltage to the second capacitive means; and a second rectifying means for applying the first voltage to the inductive means; and a third rectifying means wherein the third rectifying means comprises a second bridge rectifier for rectifying the AC input voltage and providing a second rectified voltage, wherein the second bridge rectifier comprises at least one component of the first full bridge rectifier; and a resistive means for applying the second rectified voltage to the first capacitive means.

2. The power factor correction circuit of claim 1, wherein the inductive means conducts at least one current, and wherein the second rectifying means comprises a diode, and wherein a cathode of the diode is coupled to a first terminal of the inductive means.

3. The power factor correction circuit of claim 2, wherein an anode of the second rectifying means is coupled to a first terminal of the first capacitive means.

4. The power factor correction circuit of claim 1,
wherein the resistive means applies the second rectified voltage to the first capacitive means; and
wherein the inductive means applies the first rectified voltage to the second capacitive means.

5. The power factor correction circuit of claim 1, further comprising a second resistive means coupled to the first rectifying means for minimizing parasitic oscillations.

6. The power factor correction circuit of claim 1, further comprising a second resistive means coupled to the second rectifying means for minimizing parasitic oscillations.

7. The power factor correction circuit of claim 6, wherein the second resistive means is coupled in parallel with the second rectifying means.

8. The power factor correction circuit of claim 1, wherein the at least one DC output voltage is a first DC output voltage and a second DC output voltage
further comprising:
a fourth rectifying means configured to provide a third rectified voltage, wherein the fourth rectifying means comprises a third bridge rectifier, wherein the third bridge rectifier comprises at least one component of the first full bridge rectifier;
a third capacitive means for storing the second DC output voltage;
a second inductive means for applying the third rectified voltage to the third capacitive means; and
a fifth rectifying means for applying the second rectified voltage to the second inductive means.

9. The power factor correction circuit of claim 1, wherein the first rectifying means, the first capacitive means and the second capacitive means are coupled to ground.

10. The power factor correction circuit of claim 1, further comprising a fourth rectifying means for providing a third rectified voltages and wherein the first rectifying means is coupled to ground for providing a ground reference, wherein the fourth rectifying means is coupled to a second inductive means.

11. The power factor correction circuit of claim 10, wherein the third rectifying means comprises a pair of rectifiers providing a second rectified voltage to the first capacitive means via the resistive means.

12. The power factor correction circuit of claim 10, wherein the fourth rectifying means comprises a pair of rectifiers coupled to the first rectifying means.

13. The power factor correction circuit of claim 1, wherein the first voltage is substantially equal to zero near a zero crossing of the AC input voltage.

14. The power factor correction circuit of claim 1, wherein the second rectifying means is a passive rectifying means.

15. The power factor correction circuit of claim 1, wherein the rectified voltage provided by the first rectifying means is a DC voltage.

16. The power factor correction circuit of claim 15, wherein a voltage at a terminal of the inductive means is configured to be the at least one DC output voltage.

17. A power factor correction circuit for converting an alternating current (AC) input voltage into at least one direct current (DC) output voltage, the power factor correction circuit comprising:
a first rectifier device configured to rectify the AC input voltage and to provide a first rectified voltage based on the AC input voltage, wherein the first rectifying device comprises a first full bridge rectifier;
a first capacitor configured to store a first voltage;
a second capacitor configured to store the at least one DC output voltage;
an inductor coupled to the second capacitor and configured to apply the first rectified voltage to the second capacitor; and
a second rectifier device configured to apply the first voltage to the inductor;
a third rectifying device comprising a second bridge rectifier configured to rectify the AC input voltage and to provide a second rectified voltage based on the AC input voltage, wherein the second bridge rectifier comprises at least one component of the first full bridge rectifier; and
a resistor configured to apply the second rectified voltage to the first capacitor.

18. The power factor correction circuit of claim 17, wherein the second rectifier device comprises at least one of a diode, a plurality of diodes, or a diode bridge.

19. The power factor correction circuit of claim 17, wherein the first rectifier device is configured to provide a first rectified voltage and the third rectifying device is configured to provide a second rectified voltage; and
wherein the resistor is coupled to the first capacitor and is configured to apply the first rectified voltage to the first capacitor; and
wherein the inductor is coupled to the second capacitor and is configured to apply the second rectified voltage to the second capacitor.

20. The power factor correction circuit of claim 17, further comprising a second resistor coupled to the first rectifier device.

21. The power factor correction circuit of claim 17, wherein the second rectifier device is a passive rectifier device.

22. A power factor correction circuit for converting an alternating current (AC) input voltage into at least one direct current (DC) output voltage, the power factor correction circuit comprising:
a first rectifier device configured to rectify the AC input voltage and to provide a rectified voltage based on the AC input voltage, wherein the first rectifier device is a full bridge rectifier;
a first capacitor configured to store a first voltage;
a resistor configured to apply the rectified voltage to the first capacitor;
a second capacitor configured to store the at least one DC output voltage;
an inductor coupled to the second capacitor and configured to apply the rectified voltage to the second capacitor;
a second rectifier device; and
a third rectifier device coupled to the second rectifier device and the first rectifier device; and
wherein the second rectifier device is configured to apply the first voltage stored by the first capacitor to the inductor, wherein the second rectifier is in parallel with the resistor; and wherein the inductor is configured to conduct a current, and
wherein the third rectifier device is configured to rectify the current of the inductor; and
wherein the inductor has a value such that the inductor is configured to complete discharging of the first capacitor near a zero crossing of the AC input voltage.

\* \* \* \* \*